United States Patent
Mate et al.

(10) Patent No.: US 12,470,886 B2
(45) Date of Patent: Nov. 11, 2025

(54) RENDERING ENCODED 6DOF AUDIO BITSTREAM AND LATE UPDATES

(71) Applicant: Nokia Technologies Oy, Espoo (FI)

(72) Inventors: Sujeet Shyamsundar Mate, Tampere (FI); Antti Eronen, Tampere (FI); Jussi Leppänen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 170 days.

(21) Appl. No.: 17/907,804

(22) PCT Filed: Mar. 9, 2021

(86) PCT No.: PCT/FI2021/050169
§ 371 (c)(1),
(2) Date: Aug. 29, 2022

(87) PCT Pub. No.: WO2021/186104
PCT Pub. Date: Sep. 23, 2021

(65) Prior Publication Data
US 2023/0171557 A1 Jun. 1, 2023

Related U.S. Application Data

(60) Provisional application No. 62/990,022, filed on Mar. 16, 2020.

(51) Int. Cl.
*H04S 7/00* (2006.01)
(52) U.S. Cl.
CPC ........... *H04S 7/302* (2013.01); *H04S 2400/11* (2013.01)
(58) Field of Classification Search
CPC ............................ H04S 7/302; H04S 2400/11
(Continued)

(56) References Cited

U.S. PATENT DOCUMENTS

2011/0040396 A1    2/2011 Kraemer et al.
2015/0065248 A1    3/2015 LaTendresse et al. ......... 463/35
(Continued)

FOREIGN PATENT DOCUMENTS

JP    2017530619 A    10/2017
WO    2019/068959 A1    4/2019
(Continued)

OTHER PUBLICATIONS

"MPEG-I Audio Architecture and Requirements", Audio Sub Group, ISO/IEC JTC1/SC29/WG11, MPEG2019/N18158, Jan. 2019, pp. 1-6.

(Continued)

*Primary Examiner* — William A Jerez Lora
(74) *Attorney, Agent, or Firm* — McCarter & English, LLP

(57) ABSTRACT

Examples of the disclosure relate to apparatus, methods and computer programs for enabling audio content rendering. An example apparatus comprising means for receiving a bitstream which comprises audio content; means for receiving dynamic content independent from the bitstream; means for receiving at least one instruction for the dynamic content from at least one of: the received bitstream or the received dynamic content; and means for rendering audio with a renderer based upon the audio content of the bitstream, the received dynamic content, and the at least one instruction. In an embodiment, the means for receiving the at least one instruction comprises means for determining presence the of at least one instruction for the dynamic content in the bitstream, When the bitstream does not comprise the at least one instruction for the received dynamic content, the apparatus comprising means for rendering audio with a renderer based upon the audio content of the bitstream without (Continued)

MPEG-I AUDIO REFERENCE ARCHITECTURE AND RELEVANCE OF DYNAMIC SCENE UPDATES (OR DYNAMIC CONTENT RENDERING TOGETHER WITH BITSTREAM CONTENT RENDERING)

adapting the audio based upon the received dynamic content, When the bitstream comprises the at least one instruction for the received dynamic content, the apparatus comprising means for rendering the audio with the renderer based upon the audio content of the bitstream, the received dynamic content, and the at least one instruction. In a further embodiment, the apparatus further comprising means for determining position of audio elements in the audio scene and audio elements in the dynamic content. When the audio elements in the audio scene and the audio elements in the dynamic content are in a same acoustic environment, the apparatus comprising means for rendering audio with the renderer based upon the audio content of the bitstream without adapting the audio based upon the received dynamic content. When the audio elements in the audio scene and the audio elements in the dynamic content are not in the same acoustic environment, the apparatus comprising means for rendering the audio with the renderer based upon both the audio content of the bitstream and the received dynamic content. In an embodiment, the apparatus further comprising means for determining an anchor object in an audio scene; means for determining at least one instruction for dynamic content relative to the anchor object; and means for transmitting the audio scene in a bitstream, where the bitstream comprises the at least one instruction.

17 Claims, 11 Drawing Sheets

(58) Field of Classification Search
USPC .................................. 381/1, 2, 303, 306, 307
See application file for complete search history.

(56) References Cited

U.S. PATENT DOCUMENTS

| 2018/0091918 | A1* | 3/2018 | Lee ........................ G10L 19/008 |
| 2019/0139562 | A1  | 5/2019 | Fueg et al. |
| 2022/0021997 | A1* | 1/2022 | Morales ................... G06N 3/04 |

FOREIGN PATENT DOCUMENTS

| WO | 2019/141899 A1 | 7/2019 | |
| WO | WO-2019197349 A1 * | 10/2019 | ............. H04S 7/302 |
| WO | 2020/012063 A2 | 1/2020 | |

OTHER PUBLICATIONS

"MPEG-I 6DoF Audio Encoder Input Format", Audio Sub Group, ISO/IEC JTC1/SC29/WG11, MPEG2020/N18979, Jan. 2020, 27 pages.

International Search Report and Written Opinion received for corresponding Patent Cooperation Treaty Application No. PCT/FI2021/050169, dated Jun. 24, 2021, 18 pages.

* cited by examiner

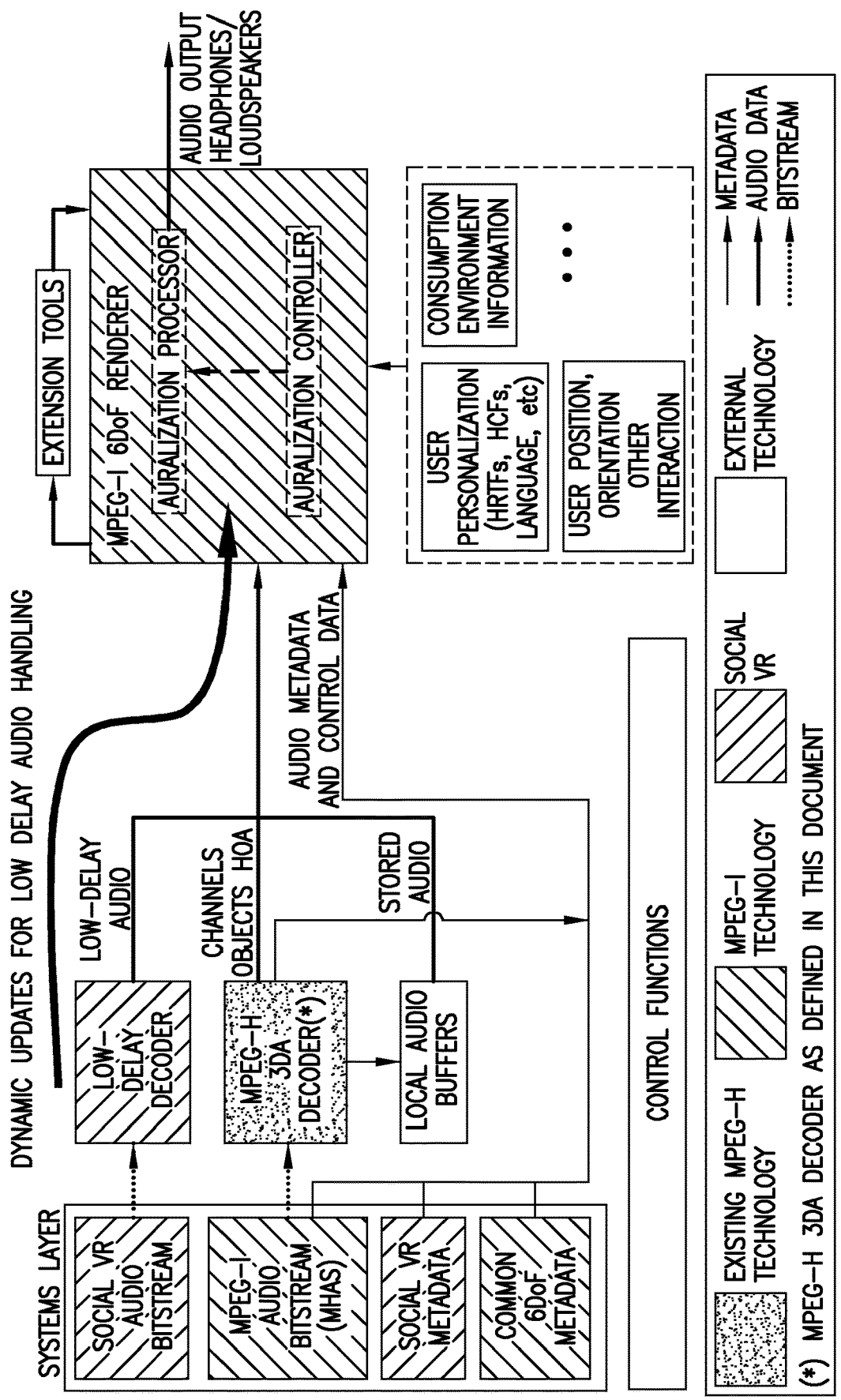
FIG. 1: MPEG-I AUDIO REFERENCE ARCHITECTURE AND RELEVANCE OF DYNAMIC SCENE UPDATES (OR DYNAMIC CONTENT RENDERING TOGETHER WITH BITSTREAM CONTENT RENDERING)

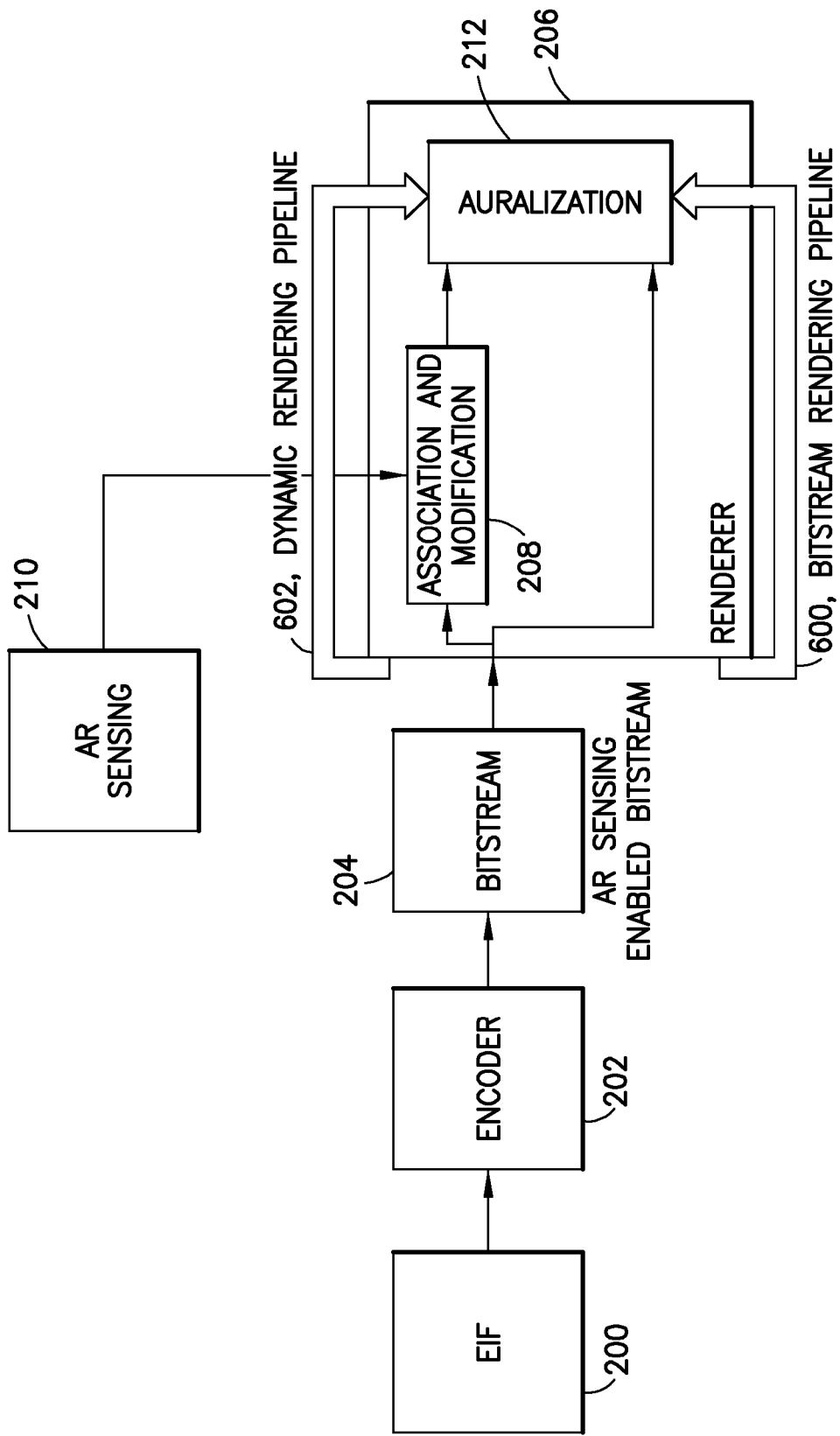
FIG. 2: SCENARIO DEPICTS THE AR SENSING INTERFACE INTERWORKING WITH AR ENABLED BITSTREAM

```
<AudioScene id="scn:gigAdvertisement">
    <AnchorObject ref_id="anchor:poster" CommonAcousticEnvironment="true"
    Deformable="true">
        <ObjectSource id="src:cajon"
            position="-0.95 1.5 -3.5"
            orientation="0 0 0"
            signal="signal:cajon"/>
        <ObjectSource id="src:bass"
            position="0.95 1.5 -3.5"
            orientation="0 0 0"
            signal="signal:bass"/>
    </AnchorObject>
    ...
</AudioScene>
```

FIG. 3: AN EIF REPRESENTATION OF THE ANCHOR OBJECT DEFINITION WHICH IS INCLUDED IN THE BITSTREAM DURING THE CONTENT CREATION PHASE. THE POSITION OF THE ObjectSources DEFINED IN THE EIF ARE RELATIVE TO THE AnchorObject POSITION OBTAINED AS DYNAMIC CONTENT

```
<DynamicInfo id="room:Nokia_listening_room">

<AnchorUpdate ref_id="anchor:poster" position="0 -3.5 0"
orientation="0 0 0"/>

</DynamicInfo>
```

FIG.4: DYNAMIC CONTENT ILLUSTRATION CONTAINS THEAnchorUpdate WITH THE ref_id WHICH MATCHES THE TARGET AnchorObject IN THE BITSTREAM

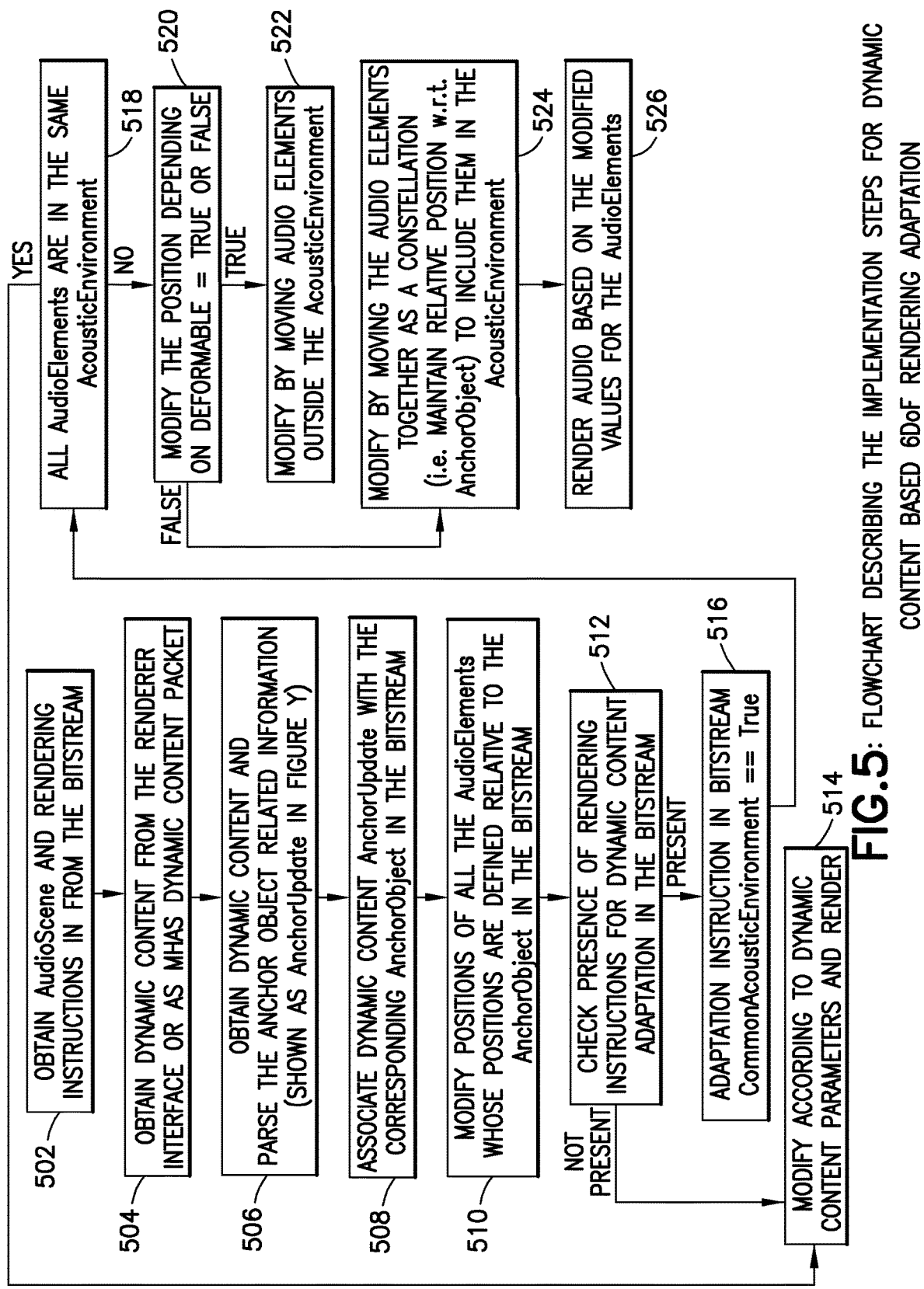
FIG.5: FLOWCHART DESCRIBING THE IMPLEMENTATION STEPS FOR DYNAMIC CONTENT BASED 6DoF RENDERING ADAPTATION

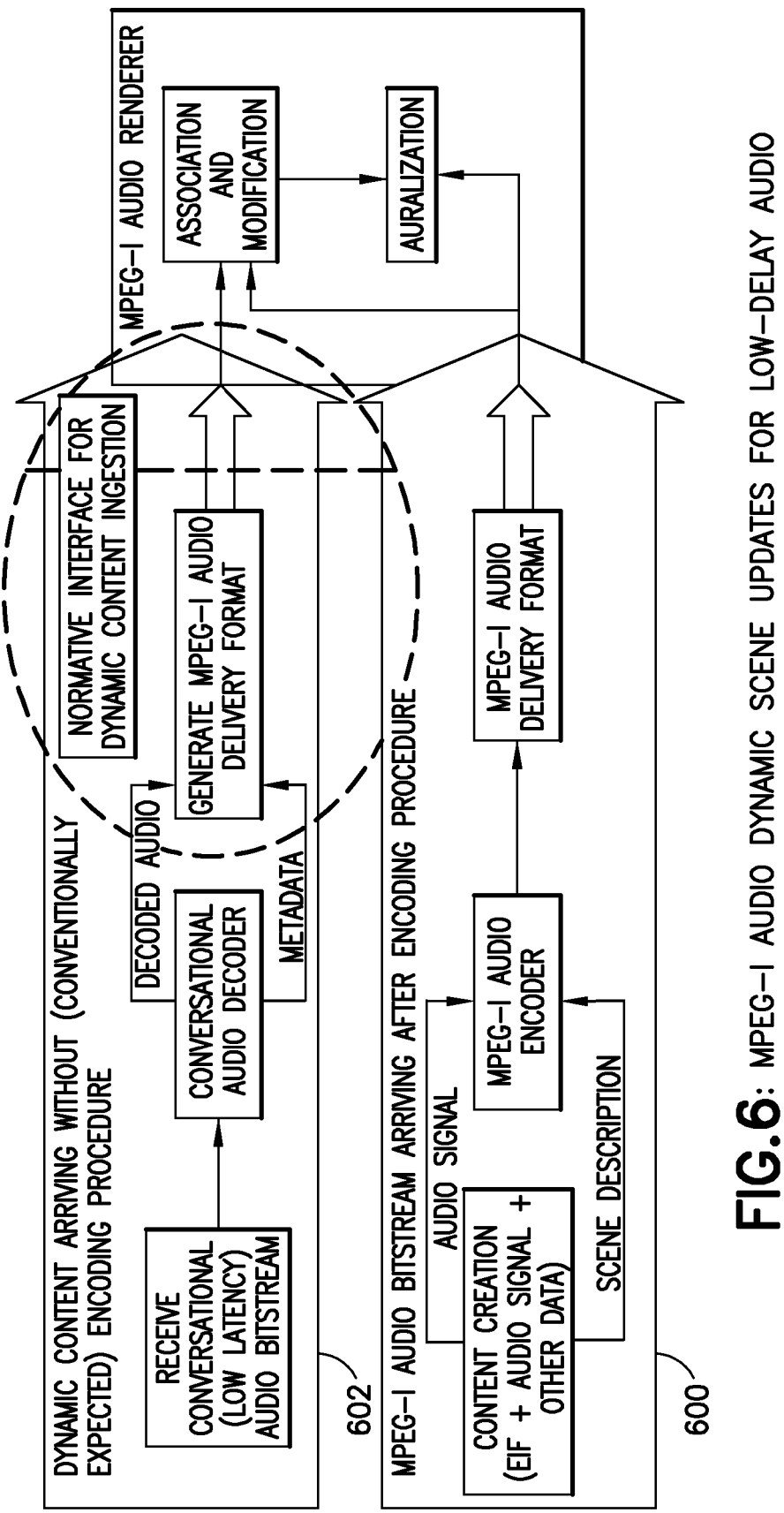
FIG.6: MPEG-I AUDIO DYNAMIC SCENE UPDATES FOR LOW-DELAY AUDIO

```
<AudioScene id="scn:SocialARVR">
    <AnchorObject ref_id="anchor:remoteuser1" AcousticModeling="true">
        <ObjectSource id="src:remoteuser1-audioobject"
            position="null null null"
            orientation="null null null"
            signal="signal:communicationaudio"/>
    </AnchorObject>
    ...
</AudioScene>
```

FIG. 7: AN EIF REPRESENTATION OF THE ANCHOR OBJECT DEFINITION WHICH IS INCLUDED IN THE BITSTREAM DURING THE CONTENT CREATION PHASE. THE POSITION AND ORIENTATION OF THE ObjectSources DEFINED IN THE EIF FOR THIS PARTICULAR SOCIAL VR USER IS "NULL NULL NULL" TO INDICATE THAT IT WILL NOT BE VISIBLE UNLESS DYNAMIC CONTENT CORRESPONDING TO THIS ENTITY IS NOT RECEIVED. FURTHERMORE, THE AUDIO SIGNAL FOR THIS AUDIO OBJECT IS INDICATED AS "COMMUNICATION AUDIO" AS IT IS NOT AN EXISTING AUDIO TRACK IN THE MPEG-I AUDIO BITSTREAM

```
<DynamicInfo id="room:SocialARVR">

<AnchorUpdate ref_id="anchor:remoteuser1" position="0 -3.5 0"
    orientation="0 0 0" spatialAudio=true/false
    communicationAudio="signal:stream-id count order"/>

</DynamicInfo>
```

FIG. 8: DYNAMIC CONTENT ILLUSTRATION CONTAINS THE AnchorUpdate WITH THE ref_id WHICH MATCHES THE TARGET AnchorObject IN THE BITSTREAM. FURTHERMORE, THE DYNAMIC CONTENT ALSO INDICATES IF THE RECEIVED AUDIO IS ALREADY REVERBERATED (spatialAudio==true) OR DRY (spatialAudio==false)

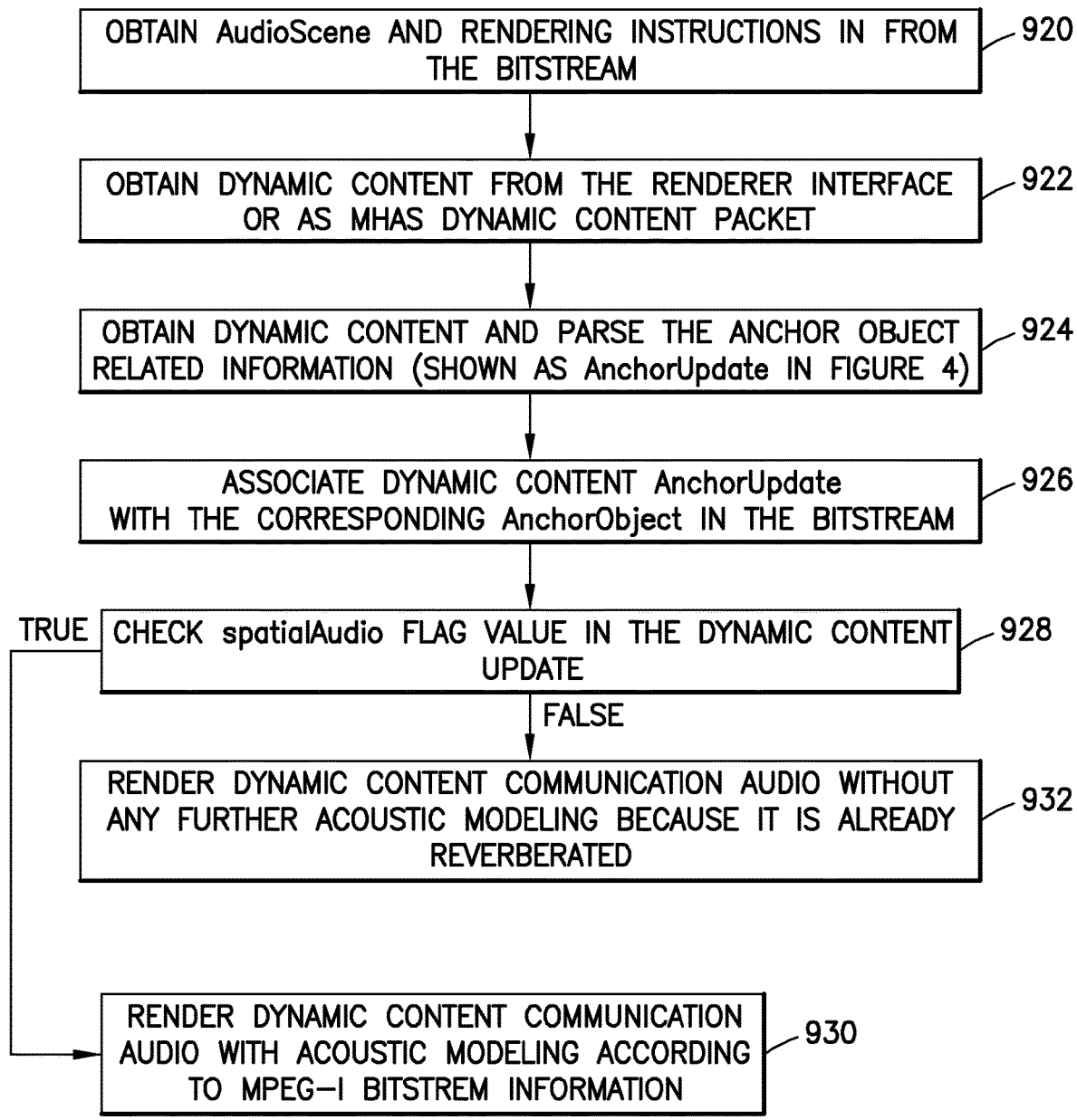
FIG.9: FLOWCHART DESCRIBING THE IMPLEMENTATION STEPS FOR SOCIAL AR/VR

RENDERING ENCODED 6DOF AUDIO BITSTREAM AND LATE UPDATES

RELATED APPLICATION

This application claims priority to PCT Application No. PCT/FI2021/050169, filed on Mar. 9, 2021, which claims priority to U.S. Provisional Application No. 62/990,022, filed on Mar. 16, 2020, each of which is incorporated herein by reference in its entirety.

BACKGROUND

Technical Field

The example and non-limiting embodiments relate generally to audio rendering.

DETAILED DESCRIPTION OF EMBODIMENTS

Features as described herein may be used to provide a method for adaptation of audio content rendering. This may comprise, for example, six degree of freedom (6DOF) rendering of audio, such as MPEG-I audio bitstream content for example, while adhering to content creator instructions, to incorporate dynamic content. Bitstream content is data which has been created by encoding the 6DOF audio scene description, the raw audio signals and the MPEG-H encoded/decoded audio signals. Other interchangeable terms are encoded content, MPEG bitstream. An example representation of the encoded bitstream may comprise the scene description obtained as "EIF" (Encoder Input Format) and metadata required for 6DoF rendering. The SixDoFMeta entity may contain encoder generated information, such as the relevant reflecting surfaces, and acoustic environment parameters for example. The acoustic environment parameters may consist of parameters such as reverberator parameters for example. Below is an example (which should not be taken as limiting the scope of the invention or in a restrictive manner):

```
<AudioScene id="Scene1">
....
....
<Scene description describing the audio element entities,
acoustic parameters, reflecting surfaces, etc.>
...
...
....
</AudioScene>
<SixDoFMeta id="as:Scene1 SixDoF Metadata">
    <ReflectingElement id="wall_1_1">
        <Vertex position="3.750000 0.000000 4.650000"/>
        <Vertex position="3.750000 0.000000 -4.650000"/>
        <Vertex position="3.750000 4.199100 -4.650000"/>
        <Vertex position="3.750000 4.199100 4.650000"/>
    </ReflectingElement>
    <ReflectingElement id="wall_1_2">
        <Vertex position="-3.750000 0.000000 4.650000"/>
        <Vertex position="3.750000 0.000000 4.650000"/>
        <Vertex position="3.750000 4.199100 4.650000"/>
        <Vertex position="-3.750000 4.199100 4.650000"/>
    </ReflectingElement>
    <ReflectingElement id="wall_1_3">
        <Vertex position="-3.750000 0.000000 -4.650000"/>
        <Vertex position="-3.750000 0.000000 4.650000"/>
        <Vertex position="-3.750000 4.199100 4.650000"/>
        <Vertex position="-3.750000 4.199100 -4.650000"/>
```

```
    </ReflectingElement>
    <AcousticEnvironmentMeta id="acEnv:Lab">
        <ReverberatorParameters>
            <maxDelay="5000.000000" />
            <speedOfSound="343.000000" />
            <fs="48000.000000" />
            <xSize="7.500000" />
            <ySize="4.199100" />
            <zSize="9.300000" />
            <reverbTime="0.290000" />
            <reverbTimeAt1kHz="0.113333" />
            <randomness="1.000000" />
        </ReverberatorParameters>
    </AcousticEnvironmentMeta>
</SixDoFMeta>
```

Dynamic content is data which arrives directly to the renderer during playback. Other interchangeable terms are low latency content, unpredictable content.

The content creator instructions may comprise content creator defined instructions in the bitstream to guide the renderer in handling bitstream content and dynamic content. The dynamic content may comprise audio scene changes that are not defined in the bitstream, but arrive directly to the renderer at render time (as opposed to audio scene changes which are defined in the bitstream). Thus, features as described herein may be used for modifying the rendering of content defined in the bitstream based on instructions in the bitstream and content which is not in the bitstream.

In an example embodiment, the bitstream may contain an indication about which type of audio scene changes are allowed for the audio scene, such as dynamic versus defined in the bitstream for example. Furthermore, the indication may comprise a prioritization order based on the type of audio scene change.

SUMMARY OF THE FIGURES

For a better understanding of the present application, reference will now be made by way of example to the accompanying drawings in which:

FIG. 1 illustrates a MPEG-I audio reference architecture and relevance of dynamic scene updates (or dynamic content rendering together with bitstream content rendering);

FIG. 2 illustrates an overview of the dynamic content assisted rendering for AR scenarios;

FIG. 3 shows an EIF representation of the anchor object definition;

FIG. 4 shows a dynamic content illustration with an anchor object position information and its identifier;

FIG. 5 illustrates an example of the implementation for a MPEG-I renderer performing adaptation of 6DoF rendering based on the content creator instructions;

FIG. 6 shows MPEG-I audio dynamic scene updates for low-delay audio;

FIG. 7 illustrates an EIF representation of an anchor object definition;

FIG. 8 illustrates a dynamic content and further shows if a received audio is reverberated or dry;

FIG. 9 illustrates example steps to implement the 6DoF rendering adaptation of the received dynamic content for a social AR/VR;

EXAMPLES OF 6DOF RENDERING ADAPTATION

Figure 10:
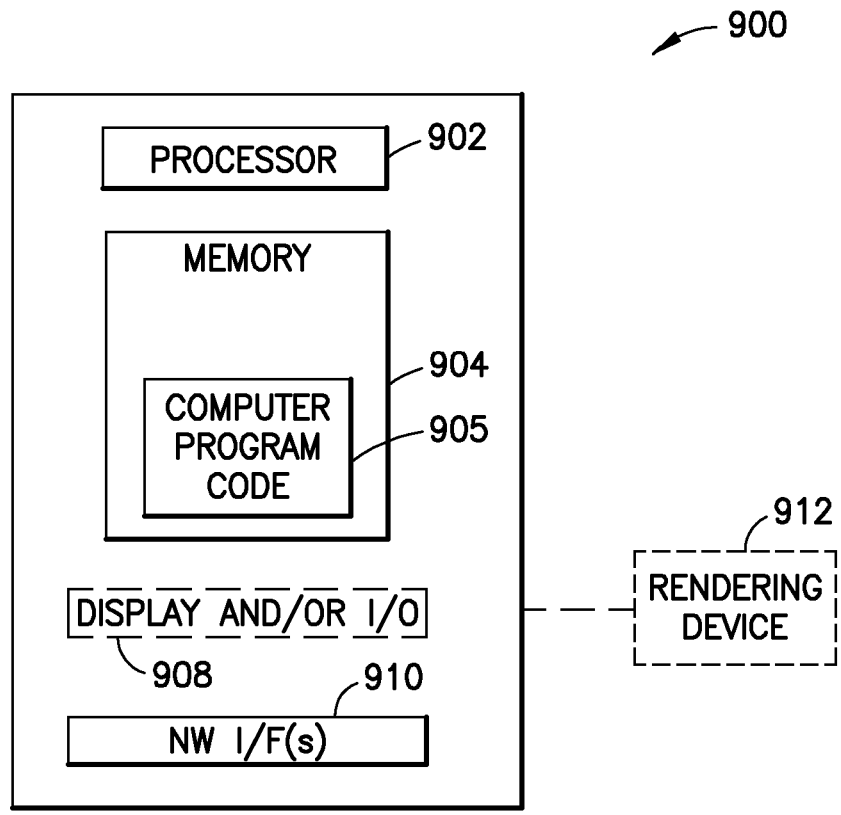
FIG. 10 shows an example apparatus configured to implement features as described.

1. One example may comprise re-alignment of audio elements' position performed based on the content creator specified approach when a dynamic audio scene change contains different position compared to bitstream content. For example, if a group of audio elements have been assigned to always belong to a common acoustic environment (such as assigned by the content creator for example) the adaptation for a dynamic update may ensure this condition is upheld. An acoustic environment is a space with certain acoustic characteristics and is defined in the MPEG-I encoder input format. In practice, the condition can mean that the audio elements may be located in a certain space as a whole group; so that some elements are not outside the space (e.g., in two different rooms separated by a wall).
2. Another example may be based on the content creator intent in the bitstream, where the renderer controls the application of acoustic modelling for dynamic content comprising communication audio from a remote user in social Virtual Reality (VR). This is also applicable to social AR. In an example, the content creator may indicate in the bitstream that communication audio needs to be reverberated. In the case of dry communication audio, the renderer may apply acoustic modelling on the signal according to the bitstream indication, but if the communication audio is already reverberated (IVAS audio), no acoustic modelling is applied.

As an example, this may be achieved by:

the adding of association and modification metadata in the MPEG-I audio bitstream. The association and modification metadata may be defined as a new entity, an "anchor-object", in the encoder input format (EIF). The EIF may be incorporated in the bitstream by the MPEG-I audio encoder.

a new interface may be added to the MPEG-I Audio renderer to ingest the dynamic content (i.e. audio data or information available ONLY during playback) for a new late binding adoption module in the MPEG-I Audio renderer. The information adoption module may perform adoption of dynamic content information as indicated by the anchor-object entity in the bitstream content. The dynamic content information may comprise instructions for determination of rendering parameters.

Knowledge of position of audio elements which are related to real world or real time features or objects, available in Augmented Reality (AR) for example, is available during content consumption. Support for rendering of audio elements which do not have positions known during content creation (i.e. during the encoding or creation of MPEG-I Audio bitstream for example) is a challenge for the acoustic modelling of the audio source. This problem is not necessarily limited to audio content, but also to all modalities which are relative to real world features or objects (such as visual content for example). However, this problem is specifically a required feature for MPEG-I Audio Renderer implementations to be useful for AR domain. The coordinates, extent, etc. of the real-world objects, which correspond to the MPEG-I audio elements, may be known only during the time of content consumption or playback. This information, because it is based upon real world, render time object(s), may arrive just in time, such as from the AR consumption device sensors (e.g., acoustic environment such as room geometry, materials, etc.), also referred to as "dynamic content" herein. Features as described herein may be used to handle this real world, real time scenario from an audio rendering perspective. This may be related to dynamic scene updates and AR evaluation; which is one of the two main categories agreed to be evaluated for a MPEG-I 6DoF Audio call for proposal.

In addition, there is currently no method available to render dynamic content in an acoustic scene which contains encoded content (with entirely known rendering properties such as position, orientation, acoustic properties, etc.). Consequently, rendering dynamic content which arrives at the renderer just in time during content consumption or playback, without the necessary processing by an encoder to determine the appropriate rendering parameters, may lead to a poor match between the rendering of the dynamic content and the bitstream content. This would lead to a poor subjective quality, and adversely impact the user experience.

Features as described herein may be used to address MPEG-I requirements related to dynamic scene updates and Social VR (w18158, MPEG-I Audio Architecture and Requirements). For example, FIG. 1 illustrates an audio reference architecture and relevance of dynamic scene updates (or dynamic content rendering together with bitstream content rendering).

Social VR

A specification may support rendering of speech and audio from other users in a virtual environment. The speech and audio may be immersive.
  a. The specification may support low-latency conversation between users within a given virtual environment.
  b. The specification may support low-latency conversation between a user within the given virtual environment and a user outside the given virtual environment.
  c. The specification may enable synchronization of audio and video of users and the scene.
  d. The specification may support metadata specifying restrictions and recommendations for rendering of speech/audio from the other users (e.g. on placement and sound level).

Features as described herein will now be described with regard to implementation with reference to two embodiments; a first one is in regard to enabling AR content consumption, and a second one is in regard to enabling Social VR content consumption.

FIG. 2 illustrates an overview of the dynamic content assisted rendering for AR scenarios. This is in regard to a real world augmentation, and the real-world cannot always be assumed to be static. Consequently, in AR scenarios, audio scene changes which were not known during content creation (i.e. during bitstream creation for AR content) are to be expected. Thus, adoption of information obtained as dynamic content may be used for high quality, believable and consistent experience.

As illustrated with FIG. 2, the conventional content creation pipeline comprises an encoder input format (EIF) file 200 which describes the audio scene as envisioned by the content creator. The EIF 200 together with the audio data (audio signals, SOFA files, etc.) may be processed by the audio encoder 202 to generate the bitstream 204. The bitstream 204 may be an AR sensing enabled bitstream. The default audio scene description may be sufficient for VR where the audio scene is entirely controlled by the content creator. However, in the case of an AR sensing enabled bitstream, additional information may be added compared to the default audio scene description. This additional information comprises the anchor objects which enable the renderer to identify the content which the renderer may need to adapt during AR content consumption. The anchor object is a separate object itself. The audio objects, etc., may be defined "inside" the anchor object in the bitstream describing the scene. Thus, the positions of the audio objects may be modified whenever the incoming dynamic update modifies the position of the anchor object. Examples of content that could be adapted includes positions/orientations of audio objects that are intended to be positioned relative to a real-life object (musical instrument audio objects next to a real-life concert advertisement poster, for example). In addition, the adapted content could be reverberation characteristics of the audio scene (RT60 values or the audio scene dimensions. Other examples could be change in the acoustic environment position or its parameters. The anchor objects may also indicate further details regarding the adaptation method, and the priority between information obtained from dynamic content versus information in the bitstream. For example, the anchor object could contain information to adapt the position of an audio object only if it is not already defined in the bitstream. As another example, only in a certain rendering mode, the dynamic content overrides bitstream information (e.g., during AR mode rendering).

Features may comprise AR sensing as illustrated by 210. This may provide input to the association and modification block 208. In the renderer 206, output from the association and modification block 208 may be provided to the auralization 212. At least two pipelines may be provided comprising the dynamic rendering pipeline 602 and the bitstream rendering pipeline 600.

The anchor object description facilitates association of the dynamic content information with the audio entities and their parameters in the bitstream. The content consumption application may identify the AR-enabled content with the presence of an indication in the received audio content. The AR capable audio bitstream indication may be implemented as a file type in the header of the MPEG-H file format.

Current MPEG-H bitstream carries information in the sample table box to indicate if it is a single file with an audio track consisting of single stream or multiple stream MPEG-H bitstream (e.g., for single file playback), a single/multiple stream streaming MPEG-H bitstream which can change its configuration at any sample (e.g., useful for streaming over DASH, MMT, etc.). Similarly, to indicate presence of 6DOF VR-only, content is implemented as a new MPEG-H bitstream containing 6DOF VR content and may be labelled as 'mi6v'

Box Types: 'mi6v', 'mi6a'
Container: Sample Table Box ('stbl')
Mandatory: No
Quantity: One or more sample entries may be present For 6DoF streaming or broadcast environments based on (such as MPEG-DASH or MPEG-H MMT for example), the MPEG-H 3D Audio configuration may include 6DOF metadata capable packets which may change at arbitrary positions of the stream, and not necessarily only on fragment boundaries. To enable this use-case, a new MHASampleEntry may be defined to indicate 6DoF rendering related metadata for MPEG-H 3D Audio files.

If the bitstream content is also enabled to be used in AR, the sample entry may be 'mi6a' for MPEG-H audio bitstream suitable for 6DOF rendering as well as AR consumption.

Another component to add AR support may comprise implementing a new interface in the MPEG-I 6DoF Audio renderer to ingest dynamic content comprising scene information obtained from the sensing apparatus 210 shown in FIG. 2 of the AR consumption device. The dynamic scene update information, in a real-world implementation, may be an interface which receives updates via a suitable interface, such as an API if the sensor system is local to the device or via a suitable transport protocol if received over a network.

The dynamic content may be ingested, and necessary rendering adaptation may be performed for the parameters defined in bitstream content, such as per the content creator instructions in the bitstream 204 shown in FIG. 2. In this particular example description, a parameter in the bitstream scene description (e.g., position of an anchor object in the audio scene) may be changed in the real world. Consequently, a corresponding change for the corresponding object in the audio scene may be delivered as dynamic content to modify the bitstream based 6DoF audio scene rendering. A similar procedure may be performed for the visual components of the scene to maintain audio-visual coherence.

AR AnchorObjects

In one example embodiment, the positions of a set of AudioElements defined in the bitstream may be only known at rendering time. The bitstream may contain an AudioScene with at least the following information:
audio signals for AudioElements in the scene
an AnchorObject with rendering instructions (see below)
AudioElement positions, which are defined relative to the position of the AnchorObject. (The position of the AnchorObject may not be known at this point.)
The position and dimensions of an AudioEnvironment (a room, for example). In some cases, the AudioEnviroment may not be in the bitstream, but input as a dynamic update.

The rendering instructions in the AnchorObject may contain the following (as shown in FIG. 3):
identifier ref_id to indicate which dynamic updates are associated with it
indication of whether or not the positions of the AudioElements (e.g., ObjectSource) that are defined to be relative to the AnchorObject need to be in the same acoustic environment (CommonAcousticEnvironment=true/false)
indication of whether or not the relative positions of the AudioElements that are defined to be relative to the AnchorObject are modifiable (Deformable=true/false)

Example XML description of dynamic update adaptation information in the EIF is shown in FIG. 3. FIG. 3 shows an EIF representation of the anchor object definition which is included in the bitstream during the content creation phase. The position of the ObjectSources defined in the EIF are relative to the AnchorObject position obtained as dynamic content.

During rendering, the renderer may receive dynamic updates via a dynamic ingestion interface or as a new type of MPEG-H Audio Stream (MHAS) packet. The updates may include the position of the anchor object and/or the positions of surfaces (walls, floor, ceiling etc.) in the current user environment. Thus, at this point one may have 1) an audio scene in the bitstream, 2) rendering instructions for dynamic updates also in the bitstream, and 3) a dynamic update at rendering time. Based on these, the renderer 206 shown in FIG. 2 may perform the following in the association and modification block 208 to perform the 6DOF rendering adaptation:

1) obtain AudioScene and rendering instructions from the bitstream
2) obtain dynamic update with an "anchor object position information" and its identifier as shown in FIG. 4.
3) associate the dynamic update with the AnchorObject that was defined in the bitstream using the identifier
4) modify the position of the AnchorObject based on the "anchor object position information".
   This may, in turn, cause the modification of the positions of all AudioElements whose positions are defined relative to the AnchorObject
5) modify rendering, if necessary, based on the rendering instructions in the bitstream
   If all of the AudioElements that have been defined to be relative to the AnchorObject are within the same AudioEnvironment, no modification is necessary
   If at least one of the AudioElements that have been defined to be relative to the AnchorObject is in a different AudioEnvironment than the AnchorObject, modification is necessary if it is mandated by the rendering instructions (CommonAcousticEnvironment=true):
   Modification may be done either by:
      modifying the positions of any AudioElement that is outside the AudioEnvironment by moving it to the closest position inside the AudioEnviroment (Deformable=true)
      modifying the positions of all AudioElements together by the same amount such that all AudioElements are within the AudioEnvironment (Deformable=false)

FIG. 4 shows a Dynamic content illustration contains the AnchorUpdate with the ref_id which matches the target AnchorObject in the bitstream. FIG. 5 illustrated an example of the implementation for a MPEG-I renderer performing adaptation of 6DoF rendering by taking into account the content creator instructions in the MPEG-I bitstream for dynamic content received during playback. In this example, the steps may comprise:
   Obtain AudioScene and rendering instructions in from the bitstream which has been retrieved by the player during playback or from a stored file as illustrated by box 502,
   Obtain dynamic content from the renderer interface or as MHAS dynamic content packet as illustrated by box 504 (This may be done, for example, by reading updates from a port or retrieve dynamic content buffer as a callback depending on the implementation.),
   Obtain dynamic content and parse the anchor object related information (shown as AnchorUpdate in FIG. 4) as illustrated by box 506 (The obtained dynamic content information may be parsed to determine presence of a valid anchor object which is aligned with the dynamic update indicator in the bitstream.),
   Associate dynamic content AnchorUpdate with the corresponding AnchorObject in the bitstream as illustrated by box 508 (This association may be considered successful if the anchor object and anchor update have a matching identifier.),
   Modify positions of all the audio elements whose positions are defined relative to the AnchorObject in the bitstream as illustrated by box 510,
   Check presence of rendering instructions for dynamic content adaptation in the bitstream as illustrated by box 512,
      If not present, modify according to dynamic content parameters and render as illustrated by box 514,
      If present, adaptation construction in bitstream, CommonAcousticEnvironment equals True as illustrated by box 516,
      Check if All audio elements are in the same acoustic environment as illustrated by box 518,
         If yes, modify according to dynamic content parameters and render as illustrated by box 514,
         If no, modified the position depending on the Deformable equals True or False as illustrated by box 520,
            If true, modified by moving audio elements outside the AcousticEnvironment as illustrated by box 522,
            If false, modified by moving the audio elements together as a constellation as illustrated by box 524, and render audio based on the modified values for the AudioElements as illustrated by box 526, The additions for the steps in the flowchart are applicable to all the flowcharts included subsequently.

The anchor object related AudioElements may also be a multi-channel ObjectSource which is implemented by taking into account the CommonAcousticEnvironment and Deformable content creator instructions for rendering adaptation. Thus, if the multi-channel object cannot fit in the single AcousticEnvironment, then it may be shifted. However, if there is a flag, such as which indicates "deformable=1" for example, then the object may be compressed to fit the entire object in the single AcousticEnvironment.

In another example embodiment the Update message as defined in EIF may be extended to allow updates via dynamic content in addition to the currently specified Updates. The currently specified updates may be done based on a predetermined timestamp, condition-based update (e.g., location-based trigger) and explicit user interaction (e.g., turn on the radio). An EIF Update may be similar to that described in clause 2.2 of MPEG-I 6DoF Audio Encoder Input Format, ISO/IEC JTC 1/SC 29/WG 11, N18979, Jan. 17, 2020, which describes Scene Updates with the declaration part in a scene.xml file may be followed any number of <Update> nodes. They have the following syntax:

<Update>
Declares one or more changes to the audio scene. The update is
performed, when the specified time is reached, or
the condition changed its state to the logical value expressed by fireOn,
the update is triggered by its ID or index by an external entity
The fireOn parameter determines whether the update fires when the condition
changes from false-to-true (fireOn = "true") or from true-to-false (fireOn = "false").
This is helpful for if-else type conditional updates.
An <Update> node has one or more <Modify> child nodes.

| Child node <Modify> | Count >= 1 |  |  | Description Modifications (see below) |
|---|---|---|---|---|
| Attribute | Type | Flags | Default | Description |
| id | ID | R |  | Identifier |
| index | Integer | O | none | Index identifying the update (globally unique) |
| time | Value | O | none | Time when update is performed (seconds) Note: Must be less than or equal to the duration attribute of the AudioScene. |
| condition | Condition ID | O | none | Condition |
| fireOn | Boolean | O | true | Update fires when this state is reached |
| delay | Float >= 0 | O | 0 | Postpone the update (seconds) |

<Modify>
Declares a modification of modifiable parameters of a single entity. The target entity is selected
by the id attribute. Following attributes must be attributes of the corresponding entity.
The attribute values are assigned the entities property values.
When the target entity also has attributes 'transition' or 'duration' (see below), these can be
modified by specifying them two times in the modification. The first occurrence controls the
modification parameter, while the second marks the destination value of the entities' property.
Example:
<Modify id = "src1" position = "1 2 3" orientation = "−20 5 0"/>
sets the attributes position and orientation for the entity with ID src1

| Attribute | Type | Flags | Default | Description |
|---|---|---|---|---|
| id | ID | R |  | Target entity to be modified |
| transition | Transition | O | continuous | Transition of values (see 4.13) |
| duration | Float >= 0 | O | 0 | Period for adapting from the current values to the new values (seconds) |
| * | * | * | * | Attribute of the target entity |

Note, that not every attribute can be changed. Only those entities that have an entity type specification that allows for modification can be modified (labelled 'M').

The following updates synchronously move three Object-Sources of a vehicle in motion along a trajectory.

```
<Update time="0.2">
  <Modify id="engine" position="2.2 1.7 −1.25" />
  <Modify id="tire1" position="2.2 1.7 0.75" />
  <Modify id="tire2" position="2.2 1.7 −0.95" />
</Update>
<Update time="0.4">
  <Modify id="engine" position="2.4 1.7 −1.20" />
  <Modify id="tire1" position="2.4 1.7 0.70" />
  <Modify id="tire2" position="2.4 1.7 −0.95" />
</Update>
...
```

The following example turns on the sources of a car when the listener gets close.

```
<Box id="geo:region1" position="5 0 −5" size="10 2 10" />
<ListenerProximityCondition id="cond:listenerNearCar"
region="geo:region1" />
<!-- Turn on the engine sound 100ms after the listener
entered
```

-continued

```
the region. Smoothly activate the source within
50ms. -->
<Update condition="cond:listenerNearCar" delay="0.1">
  <Modify id="engine" transition="continuous"
      duration="0.05" active="true" />
</Update>
<!-- Turn on the other sources 100ms later from the
engine -->
<Update condition="cond:listenerNearCar" delay="0.2">
  <Modify id="radio" transition="continuous"
duration="0.2" active="true" />
  <Modify id="exhaust" transition="continuous"
duration="0.1" active="true"/>
</Update>
```

The scene loops at the rate of the scene duration as specified in the AudioScene attribute. Timed updates are triggered for every loop of the scene.

The proposed update in EIF may be as follows:

```
<Update api="<api id>" >
<Modify id=(int)(AnchorObject.ref_id) transition="immediate"
position="<from API>" orientation="0,0,0", <timestamp>
/>
</Update>
```

The above will result in a message analogous to the following in the API interface:

{anchorObject.ref_id, X1, Y1, Z1, timestamp}

In the above, the timestamp can also be a sequence number to enable temporal association with the bitstream content.

For example, the renderer loop will apply the dynamic content to the right temporal segment of the bitstream content. The timestamp is thus used for associating the update message with the appropriate playback timeline.

Dynamic Content for Social AR/VR

Referring also to FIG. 6, Dynamic content for Social AR/VR is illustrated. FIG. 6 shows MPEG-I audio dynamic scene updates for low-delay audio.

Social VR is another requirement for MPEG-I Audio standard which may utilize dynamic content update. An example schematic is presented in FIG. 6. As illustrated by this figured, there are two parallel pipelines. The first pipeline 600 is the MPEG-I Audio bitstream creation, delivery and rendering pipeline. The second pipeline 602 is the dynamic content pipeline which may ingest the communication audio of the social AR/VR participant and the corresponding metadata which is rendered according to the information obtained during playback (or rendering time). In the case of Social AR/VR, in addition to the scene information, communication audio is also received during playback. The rendering of such content may be adapted to the MPEG-I audio bitstream content to ensure a harmonious merge without introducing any distortion.

Example XML description of dynamic update adaptation information in the EIF is shown in FIG. 7 which illustrates an EIF representation of the anchor object definition which is included in the bitstream during the content creation phase. The position and orientation of the ObjectSources defined in the EIF for this particular social VR user is "null null null" to indicate that it will not be visible unless dynamic content corresponding to this entity is not received. Furthermore, the audio signal for this audio object is indicated as "communication audio" as it is not an existing audio track in the MPEG-I audio bitstream.

FIG. 8 illustrates a Dynamic content which contains the AnchorUpdate with the ref_id which matches the target AnchorObject in the bitstream. Furthermore, the dynamic content may also indicate if the received audio is already reverberated (spatialAudio==true) or dry (spatialAudio==false).

FIG. 9 illustrates example steps to implement the 6DoF rendering adaptation of the received dynamic content representing a social AR/VR in the audio scene. As can be seen, both depending on the type of communication audio signal and the content intent in the bitstream, they may be leveraged. The example shown in FIG. 9 comprises:

Obtain AudioScene and rendering instructions in from the bitstream as illustrated by box 920, Obtain dynamic content from the renderer interface or as MHAS dynamic content packet as illustrated by box 922

Obtain dynamic content and parse the anchor object related information (shown as AnchorUpdate in FIG. 4) as illustrated by box 924

Associate dynamic content AnchorUpdate with the corresponding AnchorObject in the bitstream as illustrated by box 926

Check SpatialAudio flag value in the dynamic content update as illustrated by box 928

If true, render dynamic content communication audio with acoustic modelling according to MPEG-I bitstream information as illustrated by box 930

If false, rendered dynamic content communication audio without any further acoustic modelling because it is already reverberated as illustrated by box 932

FIG. 10 is an example apparatus 900 configured to implement features as described herein. The apparatus 900 comprises at least one processor 902, at least one non-transitory memory 904 including computer program code 905, wherein the at least one memory 904 and the computer program code 905 are configured to, with the at least one processor 902, cause the apparatus to implement a process, component, module, or function to implement features as described herein. The apparatus 900 may optionally include, as schematically illustrated by 908, a display, and/or a sound transducer, and/or an input and/or output such as for a sound transducer or rendering device. The sound transducer may comprise, for example, headphones, ear buds, speakers or any other type of rendering device 912. The apparatus may also comprise one or more network interface, such as schematically illustrated by 910, such as for a wireless link for example.

MPEG Audio is in the process of standardizing a 6DOF Audio codec. Currently there is no support for:

AR scenarios

Social VR

The above two are important requirements according to the MPEG-I 6DoF Audio Architecture and Requirements [w18158]. This is due to absence of any mechanism to incorporate information which is not available during content creation. For example Position of a real-world object or scene orientation which may change during content consumption.

Position of a social VR remote participant whose position may change during the consumption of 6DOF audio content.

All the agreed scenes are such contents that are known entirely before-hand, and not expected to be different compared to the created content. In other words, there are no unknown parameters during the consumption or playback of 6DoF audio content. Audio scene information such as the audio element positions, orientations, etc. are all known beforehand in the encoder input format (EIF) which is used by an MPEG-I audio encoder.

Figure 11A:
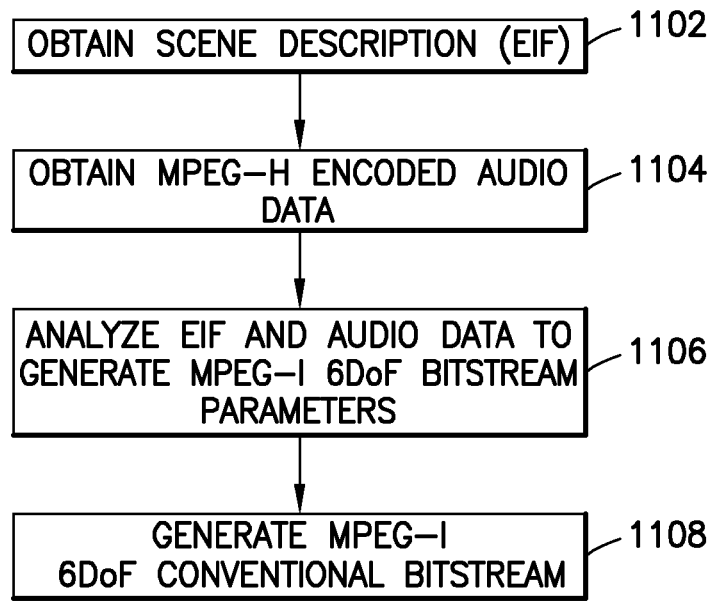
FIG. 11A shows a conventional method to generate a MPEG-I 6DoF bitstream.
Figure 11B:
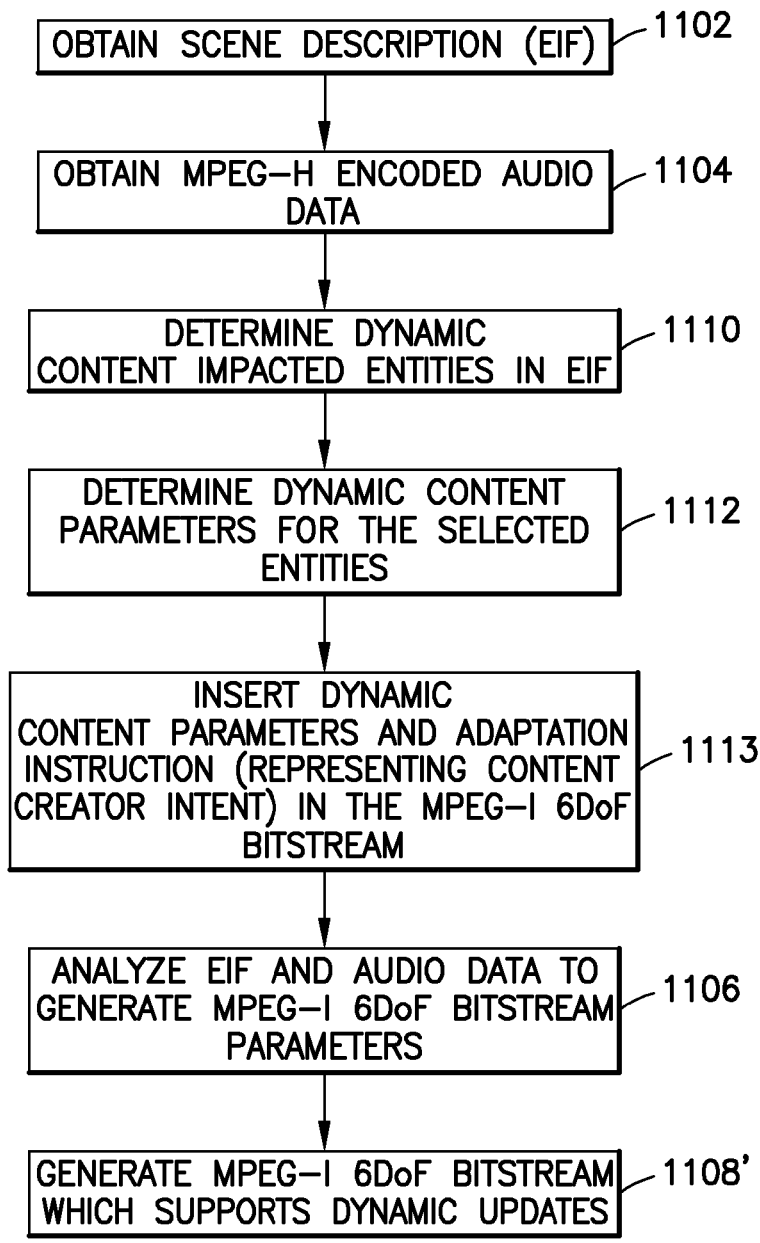
FIG. 11B shows a modified example method.

Referring also to FIG. 11A, a conventional method to generate a MPEG-I 6DoF bitstream may comprise obtain a scene description (EIF) as illustrated by block 1102; obtain a MPEG-H encoded audio data as illustrated by block 1104; analyze EIF and audio data to generate MPEG-I 6DOF bitstream parameters as illustrated by block 1106; and then generate MPEG-I 6DoF conventional bitstream as illustrated by block 1108. FIG. 11B shows a modified example method which may comprise obtain a scene description (EIF) as illustrated by block 1102; obtain a MPEG-H encoded audio data as illustrated by block 1104; determine dynamic content impacted entities in EIF as illustrated by block 1110; determine dynamic content parameters for the selected entities as illustrated by block 1112; insert dynamic content parameters and adaptation instruction (representing content creator intent) in the MPEG-I 6DoF bitstream as illustrated by block 1114; analyze EIF and audio data to generate MPEG-I 6DOF bitstream parameters as illustrated by block 1106; and then generate MPEG-I 6DoF bitstream which supports dynamic updates as illustrated by block 1108'.

Features as described herein may be provided with an example method comprising receiving a bitstream which comprises recorded audio content and at least one instruction for management or handling of dynamic content; receiving dynamic content separate from the bitstream, where the dynamic content comprises dynamic audio content; and rendering audio with a renderer based upon the recorded audio content of the bitstream, the received dynamic content, and the at least one instruction in the bitstream for management or handling of the dynamic content.

In some examples, the dynamic content will not always have audio content. There can be dynamic content which is only scene description changes or some rendering parameter change without having any audio data.

Although "recorded" is mentioned above, it should be noted that features as described herein may be used in real time and the audio content can be transmitted (just like audio communication). The received instruction in the bitstream for the dynamic content may be received separately from the received dynamic content. The rendered audio may comprise the received audio content (as discussed above) and the dynamic content based on the received instruction(s). The management may comprise the use or handling of the dynamic content and audio content (from the bitstream) with one another. The indication in the bitstream may be that a certain part of the audio scene may be rendered with the dynamic content. If the position update from the dynamic content is such that it results in different acoustic environment, the renderer may modify the rendering such that the audio rendering remains in the same acoustic environment while adapting to the new information.

Examples of the what the dynamic content might comprises include (but are not limited to):
  position of audio elements to be rendered, which may be filtered, unfiltered, etc.; not necessarily with the same position filtering process which happened to bitstream content,
  acoustic elements modified or new ones for acoustic modelling,
  audio data (e.g., for social VR communication audio),
  spatial extent and/or orientation of audio sources in the scene The received audio content in the bitstream may comprise, for example (but are not limited to):
  audio data,
  scene description of the audio scene (which comprises),
  acoustic environment information such as reflecting surfaces,
  acoustic properties such as RT60, direct to reverberation ratio, etc.,
  content creator intent,
  EIF Regarding the similarity of 'audio data' between the dynamic content and the audio content of the bitstream noted above, the audio data in the bitstream content may be MPEG-H encoded audio data for example, and the audio data in the dynamic content, on the other hand, may be a low latency encoded content (such as AMR, EVS, IVAS, etc.) for example.

An example embodiment may be provided with a method comprising: receiving a bitstream which comprises recorded audio content and at least one instruction for management of dynamic content; receiving dynamic content separate independent from the bitstream, where the dynamic content comprises dynamic audio content; and rendering audio with a renderer based upon the recorded audio content of the bitstream, the received dynamic content, and the at least one instruction in the bitstream for management of the dynamic content.

The received bitstream may comprise an audio scene. The received dynamic content may be received at a renderer interface or as a MPEG-H Audio Stream packet. The dynamic content update may arrive with a timestamp to enable association of the update with the playback timeline, or one or more bitstream content time segments. The method may further comprise determining information regarding at least one anchor object in the dynamic content. The method may further comprise associating the at least one anchor object in the dynamic content with at least one anchor object in the bitstream. The method may further comprise modifying a position of an audio element in the dynamic content whose position is defined relative to the at least one anchor object in the bitstream. The method may further comprise determining a spatial audio flag value in the dynamic content, and selecting to: when the spatial audio flag value is false, rendered dynamic content communication audio without any further acoustic modelling, or when the spatial audio flag value is true, render dynamic content communication audio with acoustic modelling according to the information in the bitstream. The method may further comprise determining position of an audio element in an audio scene of the bitstream and an audio element in the dynamic content, and selecting to: when the audio element in the audio scene and the audio element in the dynamic content are in a same acoustic environment, render audio with a renderer based upon the recorded audio content of the bitstream without adapting the recorded audio based upon the received dynamic content, or when the audio element in the audio scene and the audio element in the dynamic content are not in the same acoustic environment, render the audio with the renderer based upon both the recorded audio content of the bitstream and the received dynamic content. The method may further comprise determining position of an audio element in an audio scene of the bitstream and an audio element in the dynamic content, and selecting to: modify a position of the audio element in the dynamic content by moving the audio element outside of an acoustic environment, or modify a position of the audio element in the dynamic content by moving the audio element together as a constellation.

An example embodiment may be provided with an apparatus comprising: at least one processor; and at least one non-transitory memory including computer program code, the at least one memory and the computer program code configured to, with the at least one processor, cause the apparatus to: receiving of a bitstream which comprises audio content and at least one instruction for dynamic content; receiving of dynamic content independent from the bitstream, where the dynamic content comprises dynamic audio content; and cause rendering of audio with a renderer based upon the audio content of the bitstream, the received dynamic content, and the at least one instruction in the bitstream.

An example embodiment may be provided with a non-transitory program storage device readable by a machine, tangibly embodying a program of instructions executable by the machine for performing operations, the operations comprising: receiving a bitstream which comprises audio content and at least one instruction for dynamic content; receiving dynamic content independent from the bitstream, where the dynamic content comprises dynamic audio content; and rendering audio with a renderer based upon the audio content of the bitstream, the received dynamic content, and the at least one instruction in the bitstream.

An example embodiment may be provided with an apparatus comprising: means for receiving a bitstream which comprises audio content and at least one instruction for dynamic content; means for receiving dynamic content independent from the bitstream, where the dynamic content comprises dynamic audio content; and means for rendering audio with a renderer based upon the audio content of the bitstream, the received dynamic content, and the at least one instruction in the bitstream.

An example embodiment may be provided with an apparatus comprising: circuitry configured to receive a bitstream which comprises audio content and at least one instruction for dynamic content; circuitry configured to receive dynamic content independent from the bitstream, where the dynamic content comprises dynamic audio content; and circuitry configured to render audio with a renderer based upon the audio content of the bitstream, the received dynamic content, and the at least one instruction in the bitstream.

An example embodiment may be provided with a method comprising: receiving a bitstream which comprises recorded audio content; receiving dynamic content separate independent from the bitstream, where the dynamic content comprises dynamic audio content; and determining presence of at least one instruction for management of dynamic content in the bitstream, and selecting to: when the bitstream does not comprise the at least one instruction for the received dynamic content, render audio with a renderer based upon the recorded audio content of the bitstream without adapting the recorded audio based upon the received dynamic content, and when the bitstream comprises the at least one instruction for the received dynamic content, render the audio with the renderer based upon the recorded audio content of the bitstream, the received dynamic content, and the at least one instruction.

An example embodiment may be provided with an apparatus comprising: at least one processor; and at least one non-transitory memory including computer program code, the at least one memory and the computer program code configured to, with the at least one processor, cause the apparatus to: receive a bitstream which comprises audio content; receive dynamic content independent from the bitstream, where the dynamic content comprises dynamic audio content; and determine presence of at least one instruction for dynamic content in the bitstream, and selecting to: when the bitstream does not comprise the at least one instruction for the received dynamic content, render audio with a renderer based upon the audio content of the bitstream without adapting the audio based upon the received dynamic content, or when the bitstream comprises the at least one instruction for the received dynamic content, render the audio with the renderer based upon the audio content of the bitstream, the received dynamic content, and the at least one instruction.

An example embodiment may be provided with an apparatus comprising a non-transitory program storage device readable by a machine, tangibly embodying a program of instructions executable by the machine for performing operations, the operations comprising: receiving a bitstream which comprises audio content; receiving dynamic content independent from the bitstream, where the dynamic content comprises dynamic audio content; and determining presence of at least one instruction for dynamic content in the bitstream, and selecting to: when the bitstream does not comprise the at least one instruction for the received dynamic content, render audio with a renderer based upon the audio content of the bitstream without adapting the audio based upon the received dynamic content, or when the bitstream comprises the at least one instruction for the received dynamic content, render the audio with the renderer based upon the audio content of the bitstream, the received dynamic content, and the at least one instruction.

An example embodiment may be provided with an apparatus comprising: means for receiving a bitstream which comprises audio content; means for receiving dynamic content independent from the bitstream, where the dynamic content comprises dynamic audio content; and means for determining presence of at least one instruction for dynamic content in the bitstream, and selecting to: when the bitstream does not comprise the at least one instruction for the received dynamic content, render audio with a renderer based upon the audio content of the bitstream without adapting the audio based upon the received dynamic content, or when the bitstream comprises the at least one instruction for the received dynamic content, render the audio with the renderer based upon the audio content of the bitstream, the received dynamic content, and the at least one instruction.

An example embodiment may be provided with an apparatus comprising: circuitry configured to receive a bitstream which comprises audio content; circuitry configured to receive dynamic content independent from the bitstream, where the dynamic content comprises dynamic audio content; and circuitry configured to determine presence of at least one instruction for dynamic content in the bitstream, and selecting to: when the bitstream does not comprise the at least one instruction for the received dynamic content, render audio with a renderer based upon the audio content of the bitstream without adapting the audio based upon the received dynamic content, or when the bitstream comprises the at least one instruction for the received dynamic content, render the audio with the renderer based upon the audio content of the bitstream, the received dynamic content, and the at least one instruction.

An example embodiment may be provided with a method comprising: receiving a bitstream which comprises an audio scene with recorded audio content; receiving dynamic content separate from the bitstream, where the dynamic content comprises dynamic audio content; and determining position of audio elements in the audio scene and audio elements in the dynamic content, and selecting to: when the audio elements in the audio scene and the audio elements in the dynamic content are in a same acoustic environment, render audio with a renderer based upon the recorded audio content of the bitstream without adapting the recorded audio based upon the received dynamic content, or when the audio elements in the audio scene and the audio elements in the dynamic content are not in the same acoustic environment, render the audio with the renderer based upon both the recorded audio content of the bitstream and the received dynamic content.

An example embodiment may be provided with an apparatus comprising: at least one processor; and at least one non-transitory memory including computer program code, the at least one memory and the computer program code configured to, with the at least one processor, cause the apparatus to: receive a bitstream which comprises an audio scene with audio content; receive dynamic content separate from the bitstream, where the dynamic content comprises dynamic audio content; and determine position of audio elements in the audio scene and audio elements in the dynamic content, and selecting to: when the audio elements in the audio scene and the audio elements in the dynamic content are in a same acoustic environment, render audio with a renderer based upon the audio content of the bitstream without adapting the audio based upon the received dynamic content, or when the audio elements in the audio scene and the audio elements in the dynamic content are not in the same acoustic environment, render the audio with the renderer based upon both the audio content of the bitstream and the received dynamic content.

An example embodiment may be provided with an apparatus comprising a non-transitory program storage device readable by a machine, tangibly embodying a program of instructions executable by the machine for performing operations, the operations comprising: receiving a bitstream which comprises an audio scene with audio content; receiving dynamic content separate from the bitstream, where the dynamic content comprises dynamic audio content; and determining position of audio elements in the audio scene and audio elements in the dynamic content, and selecting to: when the audio elements in the audio scene and the audio elements in the dynamic content are in a same acoustic environment, render audio with a renderer based upon the audio content of the bitstream without adapting the audio based upon the received dynamic content, or when the audio elements in the audio scene and the audio elements in the dynamic content are not in the same acoustic environment, render the audio with the renderer based upon both the audio content of the bitstream and the received dynamic content.

An example embodiment may be provided with an apparatus comprising: means for receiving a bitstream which comprises an audio scene with audio content; means for receiving dynamic content separate from the bitstream, where the dynamic content comprises dynamic audio content; and means for determining position of audio elements in the audio scene and audio elements in the dynamic content, and selecting to: when the audio elements in the audio scene and the audio elements in the dynamic content are in a same acoustic environment, render audio with a renderer based upon the audio content of the bitstream without adapting the audio based upon the received dynamic content, or when the audio elements in the audio scene and the audio elements in the dynamic content are not in the same acoustic environment, render the audio with the renderer based upon both the audio content of the bitstream and the received dynamic content.

An example embodiment may be provided with an apparatus comprising: circuitry configured to receive a bitstream which comprises an audio scene with audio content; circuitry configured to receive dynamic content separate from the bitstream, where the dynamic content comprises dynamic audio content; and circuitry configured to determine position of audio elements in the audio scene and audio elements in the dynamic content, and selecting to: when the audio elements in the audio scene and the audio elements in the dynamic content are in a same acoustic environment, render audio with a renderer based upon the audio content of the bitstream without adapting the audio based upon the received dynamic content, or when the audio elements in the audio scene and the audio elements in the dynamic content are not in the same acoustic environment, render the audio with the renderer based upon both the audio content of the bitstream and the received dynamic content.

An example embodiment may be provided with a method comprising: determining an anchor object in an audio scene; determining at least one instruction for management of dynamic content relative to the anchor object; and transmitting the audio scene in a bitstream, where the bitstream comprises the at least one instruction.

An example embodiment may be provided with an apparatus comprising: at least one processor; and at least one non-transitory memory including computer program code, the at least one memory and the computer program code configured to, with the at least one processor, cause the apparatus to: determine an anchor object in an audio scene; determine at least one instruction for dynamic content relative to the anchor object; and transmit the audio scene in a bitstream, where the bitstream comprises the at least one instruction.

An example embodiment may be provided with an apparatus comprising: a non-transitory program storage device readable by a machine, tangibly embodying a program of instructions executable by the machine for performing operations, the operations comprising: determining an anchor object in an audio scene; determining at least one instruction for dynamic content relative to the anchor object; and transmitting the audio scene in a bitstream, where the bitstream comprises the at least one instruction.

An example embodiment may be provided with an apparatus comprising: means for determining an anchor object in an audio scene; means for determining at least one instruction for dynamic content relative to the anchor object; and means for transmitting the audio scene in a bitstream, where the bitstream comprises the at least one instruction.

An example embodiment may be provided with an apparatus comprising: circuitry configured to determine an anchor object in an audio scene; circuitry configured to determine at least one instruction for dynamic content relative to the anchor object; and circuitry configured to transmit the audio scene in a bitstream, where the bitstream comprises the at least one instruction.

In one example embodiment, it is possible to receive one or more of the instructions in the dynamic content. The dynamic content information may comprise instructions for determination of rendering parameters. The one or more instructions may arrive with the dynamic content. This is a valid alternative method for implementing social VR for example. One or more instructions could be received via the bitstream and one or more instructions, or some other parts, could be included in the dynamic content.

An example embodiment may be provided with a method comprising: receiving a bitstream which comprises audio content; receiving dynamic content independent from the bitstream; receiving at least one instruction for the dynamic content from at least one of: the received bitstream or the received dynamic content; and rendering audio with a renderer based upon the audio content of the bitstream, the received dynamic content, and the at least one instruction.

An example embodiment may be provided with an apparatus comprising: at least one processor; and at least one non-transitory memory including computer program code, the at least one memory and the computer program code configured to, with the at least one processor, cause the apparatus to: receive a bitstream which comprises audio content and at least one instruction for dynamic content; receive dynamic content independent from the bitstream, where the dynamic content comprises dynamic audio content; receive at least one instruction for the dynamic content from at least one of: the received bitstream or the received dynamic content; and render audio with a renderer based upon the audio content of the bitstream, the received dynamic content, and the at least one instruction in the bitstream.

An example embodiment may be provided with an apparatus comprising: a non-transitory program storage device readable by a machine, tangibly embodying a program of instructions executable by the machine for performing operations, the operations comprising: receiving a bitstream which comprises audio content and at least one instruction for dynamic content; receiving dynamic content independent from the bitstream, where the dynamic content comprises dynamic audio content; receiving at least one instruction for the dynamic content from at least one of: the received bitstream or the received dynamic content; and rendering audio with a renderer based upon the audio content of the bitstream, the received dynamic content, and the at least one instruction in the bitstream.

An example embodiment may be provided with an apparatus comprising: means for receiving a bitstream which comprises audio content and at least one instruction for dynamic content; means for receiving dynamic content independent from the bitstream, where the dynamic content comprises dynamic audio content; means for receiving at least one instruction for the dynamic content from at least one of: the received bitstream or the received dynamic content; and means for rendering audio with a renderer based upon the audio content of the bitstream, the received dynamic content, and the at least one instruction in the bitstream.

An example embodiment may be provided with an apparatus comprising: circuitry configured to receive a bitstream which comprises audio content and at least one instruction for dynamic content; circuitry configured to receive dynamic content independent from the bitstream, where the dynamic content comprises dynamic audio content; circuitry configured to receive at least one instruction for the dynamic content from at least one of: the received bitstream or the received dynamic content; and circuitry configured to render audio with a renderer based upon the audio content of the bitstream, the received dynamic content, and the at least one instruction in the bitstream.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

The invention claimed is:

1. A method comprising:
receiving a bitstream comprising, at least, audio content;
receiving dynamic content independent from the bitstream, wherein the dynamic content comprises at least one of:
  dynamic scene update information,
  information for determining one or more rendering parameters,
  information associated with at least one audio element,
  at least one anchor object,
  audio data, or
  metadata associated with the audio data;
receiving at least one instruction for the dynamic content from the received bitstream;
modifying a position of the at least one audio element in the dynamic content that is defined relative to at least one anchor object in the bitstream; and
rendering audio with a renderer based, at least partially, on the audio content, the dynamic content, and the at least one instruction.

2. The method as claimed in claim 1, wherein the dynamic content is at least one of:
received at a renderer interface or as a MPEG-H audio stream packet; or
arriving with a timestamp to enable association of the dynamic content with a playback timeline, or one or more bitstream content time segments.

3. The method as claimed in claim 1, further comprising at least one of:
determining information regarding the at least one anchor object in the dynamic content; or
associating the at least one anchor object in the dynamic content with the at least one anchor object in the bitstream.

4. The method as claimed in claim 1, further comprising:
determining a spatial audio flag value in the dynamic content; and
selecting to:
  when the spatial audio flag value is false, render dynamic content communication audio without further acoustic modelling, or
  when the spatial audio flag value is true, render the dynamic content communication audio with acoustic modelling according to information in the bitstream.

5. The method as claimed in claim 1, further comprising:
determining a position of an audio element in the audio content of the bitstream and the position of the at least one audio element in the dynamic content; and
selecting to:
  when the audio element in the audio content and the at least one audio element in the dynamic content are in a same acoustic environment, render the audio based upon the audio content of the bitstream without adapting the audio based upon the received dynamic content, or
  when the audio element in the audio content and the at least one audio element in the dynamic content are not in the same acoustic environment, render the audio based upon both the audio content of the bitstream and the received dynamic content.

6. The method as claimed in claim 1, further comprising:
determining a position of an audio element in the audio content of the bitstream and the position of the at least one audio element in the dynamic content; and
selecting to:
  modify the position of the at least one audio element in the dynamic content, comprising moving the at least one audio element outside of an acoustic environment, or
  modify the position of the at least one audio element in the dynamic content, comprising moving the at least one audio element together as a constellation.

7. The method as claimed in claim 1, further comprising:
determining a position of audio elements in the audio content and the position of the at least one audio element in the dynamic content; and
selecting to:
  when the audio elements in the audio content and the at least one audio element in the dynamic content are in a same acoustic environment, render the audio based upon the audio content of the bitstream without adapting the audio based upon the received dynamic content, or
  when the audio elements in the audio content and the at least one audio element in the dynamic content are not in the same acoustic environment, render the audio based upon both the audio content of the bitstream and the received dynamic content.

8. The method as claimed in claim 1, further comprising:
determining an anchor object in the audio content, wherein the audio content comprises an audio scene;
determining the at least one instruction for the dynamic content relative to the anchor object; and
transmitting the audio scene in a further bitstream, where the further bitstream comprises the at least one instruction.

9. An apparatus comprising:
at least one processor; and
at least one memory storing instructions that, when executed with the at least one processor, cause the apparatus to:
receive a bitstream comprising, at least, audio content;
receive dynamic content independent from the bitstream, wherein the dynamic content comprises at least one of:
dynamic scene update information,
information for determining one or more rendering parameters,
information associated with at least one audio element,
at least one anchor object,
audio data, or
metadata associated with the audio data;
receive at least one instruction for the dynamic content from the received bitstream;
modify a position of the at least one audio element in the dynamic content that is defined relative to at least one anchor object in the bitstream; and
render audio with a renderer based, at least partially, on the audio content, the dynamic content, and the at least one instruction.

10. The apparatus as claimed in claim 9, wherein the dynamic content is at least one of:
received at a renderer interface or as a MPEG-H audio stream packet; or
arriving with a timestamp to enable association of the dynamic content with a playback timeline, or one or more bitstream content time segments.

11. The apparatus as claimed in claim 9, wherein the instructions, when executed with the at least one processor, cause the apparatus to at least one of:
determine information regarding the at least one anchor object in the dynamic content; or
associate the at least one anchor object in the dynamic content with the at least one anchor object in the bitstream.

12. The apparatus as claimed in claim 9, wherein the instructions, when executed with the at least one processor, cause the apparatus to:
determine an anchor object in the audio content, wherein the audio content comprises an audio scene;
determine the at least one instruction for the dynamic content relative to the anchor object; and
transmit the audio scene in a further bitstream, where the further bitstream comprises the at least one instruction.

13. The apparatus as claimed in claim 9, wherein the instructions, when executed with the at least one processor, cause the apparatus to:
determine a spatial audio flag value in the dynamic content; and
select to:
when the spatial audio flag value is false, render dynamic content communication audio without further acoustic modelling, or
when the spatial audio flag value is true, render the dynamic content communication audio with acoustic modelling according to information in the bitstream.

14. The apparatus as claimed in claim 9, wherein the instructions, when executed with the at least one processor, cause the apparatus to:
determine a position of an audio element in the audio content of the bitstream and the position of the at least one audio element in the dynamic content; and
select to:
when the audio element in the audio content and the at least one audio element in the dynamic content are in a same acoustic environment, render the audio based upon the audio content of the bitstream without adapting the audio based upon the received dynamic content, or
when the audio element in the audio content and the at least one audio element in the dynamic content are not in the same acoustic environment, render the audio based upon both the audio content of the bitstream and the received dynamic content.

15. The apparatus as claimed in claim 9, wherein the instructions, when executed with the at least one processor, cause the apparatus to:
determine a position of an audio element in the audio content of the bitstream and the position of the at least one audio element in the dynamic content; and
select to:
modify the position of the at least one audio element in the dynamic content, comprising moving the at least one audio element outside of an acoustic environment, or
modify the position of the at least one audio element in the dynamic content, comprising moving the at least one audio element together as a constellation.

16. The apparatus as claimed in claim 9, wherein the instructions, when executed with the at least one processor, cause the apparatus to:
determine a position of an audio element in the audio content and the position of at least one audio element in the dynamic content; and
select to:
when the audio element in the audio content and the at least one audio element in the dynamic content are in a same acoustic environment, render the audio based upon the audio content of the bitstream without adapting the audio based upon the received dynamic content, or
when the audio element in the audio content and the at least one audio element in the dynamic content are not in the same acoustic environment, render the audio based upon both the audio content of the bitstream and the received dynamic content.

17. A non-transitory computer-readable medium comprising program instructions stored thereon for performing at least the following:
causing receiving of a bitstream comprising, at least, audio content;
causing receiving of dynamic content independent from the bitstream, wherein the dynamic content comprises at least one of:
dynamic scene update information,
information for determining one or more rendering parameters, information associated with at least one audio element,
at least one anchor object,
audio data, or
metadata associated with the audio data;
causing receiving of at least one instruction for the dynamic content from the received bitstream;
causing modifying of a position of the at least one audio element in the dynamic content that is defined relative to at least one anchor object in the bitstream; and
causing rendering of audio with a renderer based, at least partially, on the audio content, the dynamic content, and the at least one instruction.

* * * * *